May 10, 1932.    R. C. ROE    1,857,332
POWER PLANT
Filed Oct. 12, 1929    3 Sheets-Sheet 3

INVENTOR
Ralph C. Roe
BY
William G. McKnight
ATTORNEY

Patented May 10, 1932

1,857,332

UNITED STATES PATENT OFFICE

RALPH C. ROE, OF ENGLEWOOD, NEW JERSEY, ASSIGNOR OF ONE-HALF TO STEPHEN W. BORDEN, OF SUMMIT, NEW JERSEY

POWER PLANT

Application filed October 12, 1929. Serial No. 399,152.

My invention relates to steam power plants and more particularly to steam power plants wherein a turbine is used for power purposes and from which steam is conducted to heaters for heating feed water to be used in the steam generating unit of the plant. My invention is particularly applicable to plants utilizing high steam pressure. Still more particularly, my invention relates to steam plants wherein feed water is successively heated to higher temperatures in direct contact with steam withdrawn from a plurality of points of different pressure in a turbine.

Amongst the objects of my invention are: To provide an efficient plant wherein feed water is heated by direct contact with steam withdrawn from the prime mover; to provide a plant arrangement and apparatus making it possible to properly heat feed water by means of steam withdrawn from a prime mover, while maintaining a proper balance of plant factors and functions; to provide a highly efficient plant which is less expensive to construct than previous plants of like type and use; to relate the load on a prime mover to the heating of feed water; to relate the heating of feed water to the load on a prime mover; to provide automatic control of a plant so that the best effect is obtained from a prime mover; to provide automatic control of a plant with a minimum of control equipment; to inter-relate plant factors to produce dependency of function making possible the simplification of regulation; to provide pump mechanism in conjunction with turbine mechanism in such a manner as to obtain improved plant efficiency; to adjust the operation of pump mechanism to turbine operation to permit direct contact feed heating by steam withdrawn from a turbine; to adjust for variations in operation incident to the general opertion of a plant; to provide means for carrying out any and all of the foregoing objects in connection with steam plants using high values of steam pressure, in accordance with present-day practices, running up to 1,000 pounds per square inch and over; to provide improved plant equipment for such high pressure plants especially adapted to efficiently heat feed water by means of steam withdrawn from a turbine at a greater number of points, all of different pressure, than is possible or practicable with previously known equipment.

Steam power plants are known which comprise a turbine and in which steam is withdrawn from a plurality of points of different pressure of the turbine for the purpose of heating feed water. In commercial plants, this heating is accomplished generally, if not wholly, in what are known as surface heaters. A surface heater is one in which there is an exchange of heat between two fluids, but in which the two fluids do not come into contact. This type of heater is otherwise known as a closed heater. In distinction, an open heater is one in which two fluids, for instance, a liquid and a gas, are brought into direct contact for the purpose of exchanging heat. It is an essential point of difference that in a surface heater, the fluids in heat exchange relation may be at different pressure, whereas in an open heater, the fluids, being in the presence of each other, are at the same pressure.

While there may be cases in which an open heater might be used for a single point of withdrawal, it has been generally considered that the open heater is not adaptable for the transfer of heat from the withdrawn steam to the feed water in cases where there are a plurality of points of steam withdrawal. It is one of the essential features of my invention that I make possible the use of open heaters for this heat transfer, regardless of whether the number of points of withdrawal are two, three, four, or more.

The problem of using open heaters for heating feed water by withdrawn steam, generally called bleed or extraction steam in the art, has arisen on account of the fact that in the open heater, both fluids are at the same pressure. Consequently, if an open heater is connected to a point of a turbine between stages, and is connected to the discharge end of a pump, it is affected by variations of pressure both at the point of withdrawal of steam from the turbine and variations of pressure of the discharge of the pump. It will readily be seen that either pressure and its variations may affect the other. That is, it is possible for the pump pressure to have an influence on the turbine and it is possible for the turbine pressure to have an influence on the pumping because there is thus established a direct connection through the open heater between the steam space of the turbine and the pump. Engineers have uniformly avoided this difficulty by resorting to the surface or closed type of feed heater.

If a number of open heaters are connected to different points of a turbine having different values of steam pressure, and a different pump supplies water to each heater, it will be seen that, if normal and proper pressures are to be maintained in the heater, corresponding to the pressures at the points of withdrawal, the pumps must be so constructed and operated that they will at all times produce a pressure which is the proper pressure for each of the respective heaters. Also the pressure at each bleed point of a turbine varies at such bleed point in accordance with variations of quantity of steam passing through the turbine. That is, each bleed point and consequently each open heater connected thereto is subject to individual pressure variations depending upon the load on the turbine.

I have overcome all these difficulties and problems by coordinating the flow of feed water to variations of load on the turbine both as to rate and conditions in a manner which will presently appear. The manner in which this is accomplished, the method of operation of my invention and the apparatus for carrying out my invention will become apparent from a consideration of the following description taken in conjunction with consideration of the accompanying drawings whereon I have illustrated a preferred plant arrangement, it being understood, however, that the invention is not limited to any particular plant arrangement.

Referring to the accompanying drawings.

Figure 1:
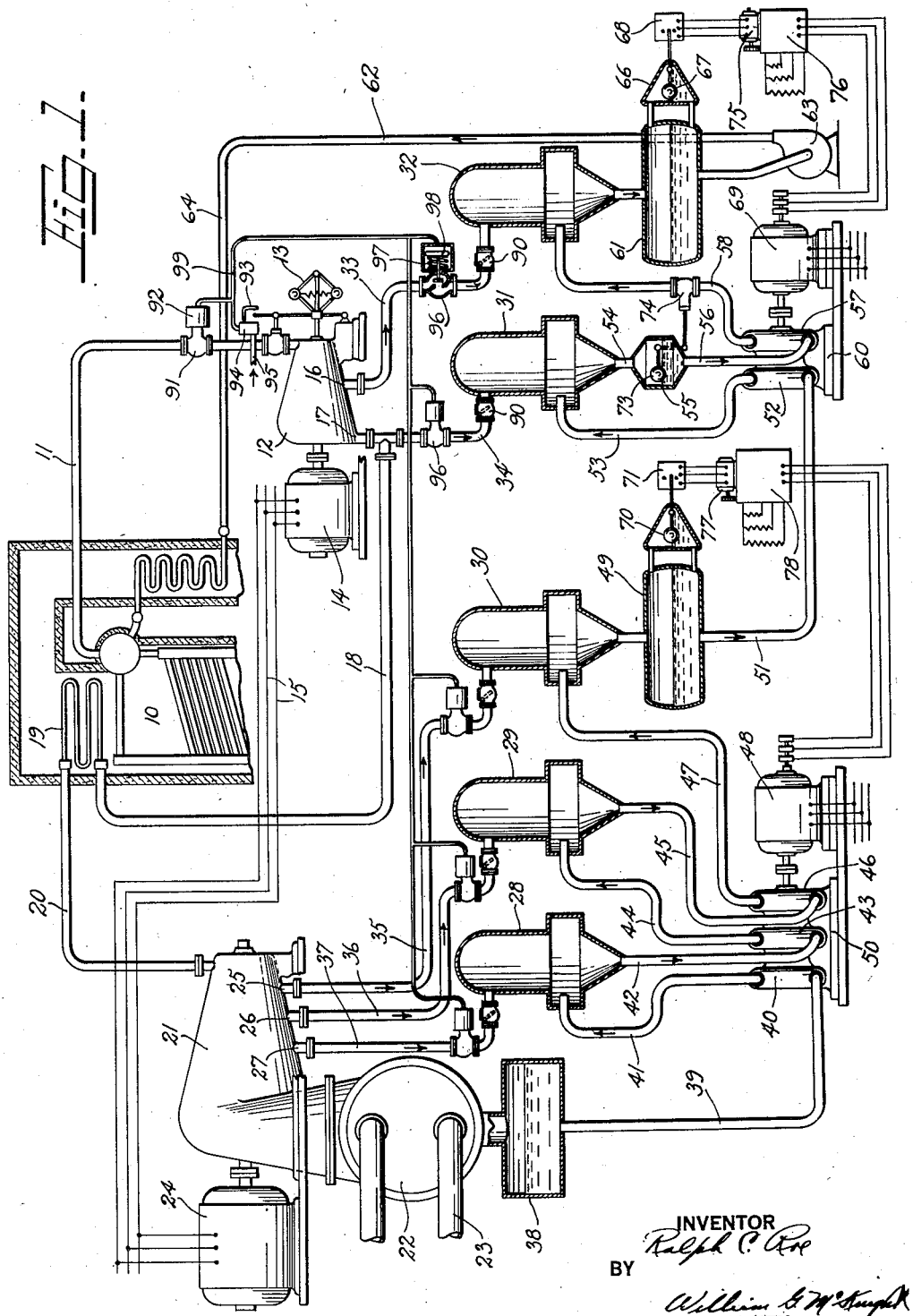
Fig. 1 is a more or less diagrammatic view of a steam plant embodying the invention.

Referring more particularly to Fig. 1, reference character 10 designates a steam generating unit comprising one or more boilers which may be of any known type, and which may be fired in any suitable way. For the particular plant illustrated in Fig. 1, it may be assumed that the boiler is designed to generate steam of, for example, 1,400 pounds per square inch. The steam produced in the boiler unit passes through conduit 11 and into a high pressure turbine section 12 comprising the usual turbine wheels and guides. The supply of steam to the turbine may be controlled in any suitable way. I have indicated a speed governor 13 as controlling the supply of steam in response to variations of speed of the turbine. It may be assumed that the centrifugal governor will tend to maintain a constant turbine speed, as for example, 3,600 R. P. M. The turbine is shown as driving an alternating current electric generator 14 which is coupled to electric lines 15. Steam is withdrawn or bled from the turbine at a point indicated by reference character 16, which may, for example, be at the fifth turbine stage. Steam not withdrawn at point 16 passes through the turbine and out at point 17, which may be considered as the high pressure turbine exhaust. There are a number of stages of the turbine between points 16 and 17. Steam leaving turbine section 12 passes in part to an open feed water heater as will presently be explained and in part through conduit 18, through a re-heater 19 and conduit 20 to a turbine section 21 of lower pressure. Turbine section 21 discharges into a condenser 22 shown as being cooled by water in conduit 23. Turbine section 21 is connected to and drives an alternating current electric generator 24, which is connected to the same electric lines 15 whereby the speed of the two generators must be the same. Since the turbine shafts are connected to the respective generators, control of speed of turbine section 12 results in simultaneous and equal control of speed of turbine section 21. The condenser operates at a vacuum, for instance, 28 inches of vacuum. It will be seen that the two turbine sections are in effect a single turbine. The pressure of steam withdrawn from turbine section 12 is substantially the same as steam entering section 21, and this pressure will be an intermediate value between the initial steam pressure generated in the boiler and the vacuum of the condenser. The intermediate pressure between the turbines will vary depending on load, being higher for higher load.

Turbine 21 is shown as having three points of steam extraction, 25, 26 and 27. It will be understood that there will be one or more stages of the turbine between each of the bleed points 25, 26 and 27.

In the steam plant illustrated there are five open heaters designated by reference characters 28, 29, 30, 31 and 32. Any of various types of open feed water heaters may be used. The illustration is intended to indicate open heaters of the type in which water enters through one or more passages and is mixed with steam and flows down therein. A conduit 33 connects extraction point 16 of turbine section 12 with open heater 32. Conduit 33 opens directly into the steam chamber in the upper part of heater 32. A conduit 34 in similar manner connects extraction point 17 with open heater 31. A conduit 35 in similar manner connects extraction point 25 with open heater 30. A conduit 36 in similar manner connects extraction point 36 with open heater 29. A conduit 37 in similar manner connects extraction point 27 with open heater 28.

Steam condensed in condenser 22 flows into a tank or hot-well 38. A conduit 39 conducts water from tank 38 to a low pressure section or unit 40 of a pump assembly 50. Water passes from section 40 through conduit 41 and is sprayed or otherwise introduced into open heater 28 into contact with steam passing therein from conduit 37. The water entering heater 28 condenses some steam and the sum of the entering water and the condensate flows down within heater 28 and through conduit 42 into a section 43 of the pump mechanism which operates at a higher pressure than section 40. From pump section 43 the water passes through conduit 44 and is in like manner introduced into the heater 29 where it condenses the steam received from conduit 36. The sum of the water entering heater 29 and the condensate formed therein flows downwardly and through conduit 45 into pump section 46. Pump section 46 operates at a higher pressure than section 43. Water leaves pump section 46 by way of conduit 47 and enters heater 30.

Pump assembly 50 comprising sections 40, 43 and 46 comprises a housing enclosing one or more pump wheels for the different pump sections, all being mounted on a common shaft and the sections being out of communication with each other except through the conduits and heaters above described. An electric motor 48 drives pump unit 50.

Water passing through conduit 47 enters heater 30 in similar manner to the other heaters and therein condenses steam passing into heater 30 from conduit 35. The sum of the water passing through conduit 47 and the condensate formed in heater 30 flows downwardly into a tank 49. Tank 49 may, if desired, be combined in a unit structure with heater 30. From tank 49 the water flows through conduit 51 and into a section 52 of a second pump assembly 60. Section 52 operates at a higher pressure than section 46 of pump 50. The water passes from section 52 through conduit 53 and into open heater 31 where further steam, introduced by way of conduit 34, is condensed. The sum of the water passing through conduit 53 and the condensate formed in heater 31 flows downwardly through conduit 54, float chamber 55 and conduit 56 into section 57 of pump mechanism 60. Water flows from pump section 57 through conduit 58 and into open heater 32. Here it condenses steam introduced through conduit 33 and the sum of the water passing through conduit 58 and the condensate formed in heater 32 flows down into a tank 61. A conduit 62 conducts the water from tank 61 to a pump 63 which forces the water through conduit 64 into the boiler 10.

It will be seen that the feed water passing through heaters 28, 29, 30, 31 and 32 is progressively heated to higher temperatures by the steam which is withdrawn from the different points of different pressure of the turbine sections.

A turbine has what is known as characteristics. These are inherent features of the turbine due to design and operation. The characteristics of a turbine may be varied by varying the design. With a turbine having five bleed points, as illustrated, and operating with an initial pressure of 1,400 pounds per square inch and a final pressure of 28 inches of vacuum, and of standard design, there are given characteristics for normal conditions for variations of steam flow through the turbine. The characteristics for any one turbine under normal operating conditions are a known factor. These characteristics can be illustrated by means of graphic representation. To illustrate this point, consider the pressure at the extraction point 16. As the load on the turbine is varied and consequently the amount of steam passing through the same varies, the pressure at extraction point 16 will vary in a definite relation to the load. These variations can be plotted on a diagram of load and pressure and the result will be a line of given form. With an average turbine of generally known construction, this line will be a substantially straight line. The pressure will increase with the load. Each of the extraction points will have its own line of pressure variation in accordance with load. These various lines are characteristics of the turbine.

I have discovered that the problem above outlined in connection with the use of open heaters in this relation can be solved by utilizing these characteristics and co-relating them with characteristics of pump mechanism and with other factors. Centrifugal pumps have characteristics, unlike displacement pumps, which can be adapted to a proper solution of this problem. It is possible to design a centrifugal pump to give a given set of characteristics of the pump. It is possible to relate the characteristics of a centrifugal pump to the characteristics of a turbine.

Having related the characteristics, I have discovered that it is further possible to simplify plant construction and to obtain improved results by relating sections of centrifugal pump units, properly constructed to give characteristics coordinate with the turbine characteristics, into unit controlled apparatus whereby the pump sections cooperate in a particular and simple and efficient manner. To accomplish this, I have modified the relation of pump characteristics to turbine characteristics by factors incident to pump operation and, specifically, determined by the head of liquid and variations of head under which each pump section operates. For this purpose the pump sections are arranged with certain relations, specifically, relations of elevation, to the open heaters as is shown by way of example in Fig. 4.

Figure 4:
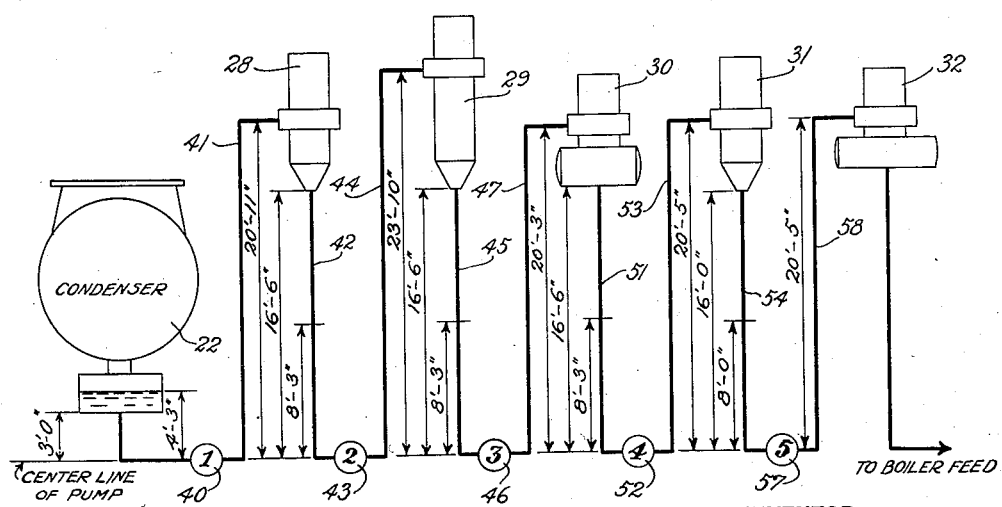
Fig. 4 shows the relative relation of certain parts incident to a feature of my invention.

In Fig. 4 the parts are diagrammatically indicated so as to show vertical heights between the open heaters and the pump sections. Like reference characters indicate like parts in Fig. 1 and Fig. 4. It will be seen that, for the arrangement which Fig. 1 designates, and which, for illustrative purposes, is taken as of a plant now under construction, there is a height of liquid in conduit 41 above pump section 40 of about 21 feet with this conduit full of water. With conduit 42 full of water, there is a height of water on the intake side or pump 43 of between 16 and 17 feet. The diagram shows the heights of liquid column above the center lines of the pump sections on both suction and discharge sides for the remaining conduits. Assume now that all five pump sections 40, 43, 46, 52 and 57 are mounted on the same shaft and rotating at the same given speed. This may be the condition for any given load. Assume that, under such condition, pump section 43 should pump water into open heater 29 at a given rate, but that due to local pump conditions or other cause, the amount pumped is somewhat too much for the given load conditions. The result will be that pump section 43 will pump water faster than it is supplied with water from pump section 40, assuming that pump section 40 is operating normally for this load condition. Consequently, the water level will fall in conduit 42. The discharge head for pump section 43 is influenced by the difference between the height of the liquid column in conduit 44 and the height of the liquid column in conduit 42 above the pump section center line. If conduit 44 remains full of liquid and the liquid drops in conduit 42, a greater pumping head is imposed on pump section 43, other factors remaining constant. It is a characteristic of a centrifugal pump that at a given speed the amount of water pumped will vary inversely to the total pumping head. Since the drop of water in conduit 42 increases the pumping head, the amount of water pumped at the given speed will decrease. Consequently, by providing the water legs as shown in Fig. 4, an automatic adjustment is obtained such that if a pump section varies from those conditions at which it should pump for the given load conditions, an adjustment is effected without any recourse to speed change and without recourse to regulating mechanism. Consequently, assuming one regulator for all the units combined, it is possible, in view of the combination of the various considerations above brought forth, to obtain coordinated relation with a minimum of automatic regulating mechanism.

It is not necessary that all the pump sections be in the same assembly, and in Fig. 1 I have shown three pump sections combined in one assembly and two pump sections combined in a second assembly. Nevertheless, the advantages are present for each assembly. For any particular plant, practical considerations may determine the advisability of combining the pump sections in one way or another.

Figure 2:
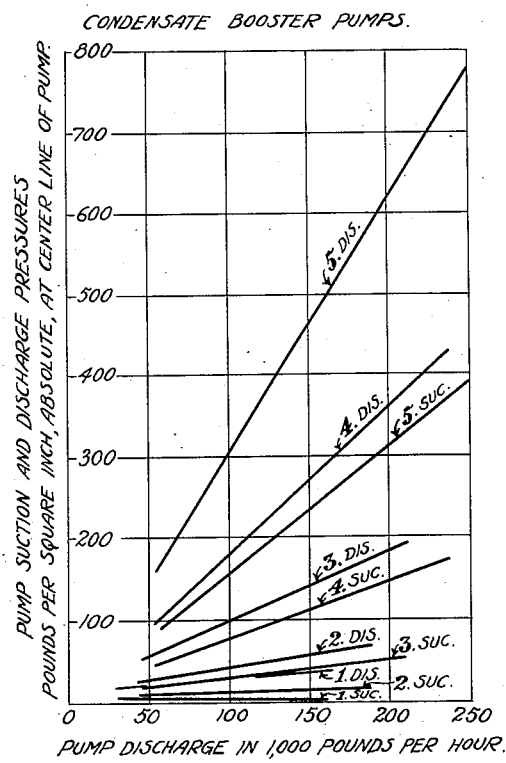
Fig. 2 is a diagram illustrating plant conditions incident to my novel method of plant operation.

The use of water legs as above described or equivalent means for accomplishing this adjustment is advantageous in practice since it makes it feasible to combine several of the pump sections into a single assembly driven by a single motor and controlled by a single speed control device, and further permits a greater latitude in types of speed regulators which could be used. It still further facilitates the design in the manufacture of the pumps, since they need not be so accurately designed or built, which makes them less expensive. Since my method of plant operation comprises the coordination of the pump characteristics to the turbine characteristics, it is necessary, in cases where the water legs are used, to take into account this factor as bearing on the pump characteristics. In Fig. 2 is shown a chart of pump characteristics in which the various factors including the water legs are taken into account. This chart is obtained by first determining the turbine characteristics, then determining the heights of water legs desirable and feasible, then calculating the pressure factors as determined from the turbine characteristics, the water leg factors, and incidental factors such as pipe friction losses. Having given the characteristics as thus determined, it is possible to design the pump sections to give such characteristics and to operate as above described in a single unit.

Figure 3:
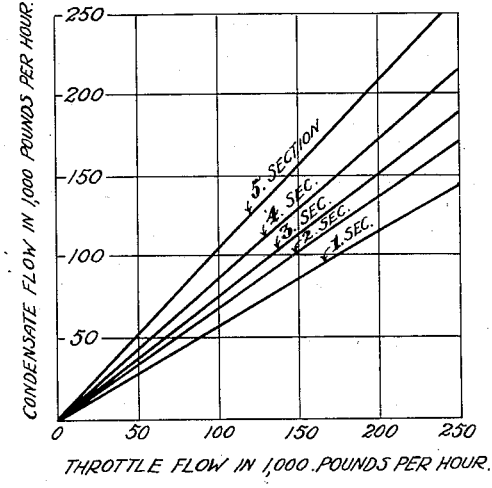
Fig. 3 is another diagram showing plant conditions.

Fig. 3 shows what the variation should be in condensate or feed water flow for each pumping element for different loads.

It will be seen that the pump elements each has a rising head curve from zero to maximum discharge quantities.

It should be kept in mind that the entire feed water system and all its component parts must pump the proper amount of water for any particular load that may happen to be on the turbine, and no more and no less, and at the same time the pumping units must maintain the proper head pressures, and no more and no less. As a factor in obtaining the proper coordination of feed water flow to turbine operation, I cause the feed water to flow through the feed water system in the same rate or substantially the same rate as the flow of steam through the turbine. This I accomplish by providing tanks in which variations of level take place dependent on the amount of steam used by the turbine. These variations of level are used to control the speed of the pumping mechanism. I employ storage tanks as shown at 38, 49 and 61 in Fig. 1, but it is to be understood that the purpose of these storage tanks is not to provide an independence between steam flow and water flow, but to take care of variations from normal flow and to permit regulation, as will be described. While these tanks may be of appreciable size to take care of abnormal undesired variations, this is incidental and not the main purpose.

Connected to tank 61 is a float chamber 66. Float 67 in this chamber moves up and down on the level of water therein which is the same as the level of water in tank 61. This float controls a regulator for controlling pump speed.

The regulator may be of various types, but I prefer the type of regulator comprising a pilot controller 68 having electric contacts, a motor 75 operable at constant speed in one or the other direction depending on contacts made or broken by movement of the float, and a motor-operated rheostat 76 operable to vary the speed of the pump motor 69 depending on the time and direction of running of motor 75. Suppose that the rate of flow of water through pipe 62 increases so that the level drops in tank 61. Float 67 will then be lowered closing a circuit in pilot 68 which will cause motor 75 to revolve in the proper direction to increase the speed of motor 69. Motor 75 will continue to run and the speed of motor 69 will continue to increase until the water level in tank 66 is raised sufficiently to open the circuit in pilot 68. If the level continues to rise in tank 61, another circuit will be closed in pilot 68 which will cause motor 75 to revolve in the opposite direction, thus causing motor 69 to slow down. Motor 75 will continue to revolve and motor 69 will continue to slow down until the circuit in pilot 68 is opened.

A similar float 70 controls a similar pilot 71 which operates in the same manner through a motor 77 and rheostat 78 to control the speed of motor 48. When the increase of water flow takes place through heaters 31 and 32 due to the increased speed of motor 69, the level will drop in tank 49 and motor 48 will be correspondingly speeded up to increase the flow of feed water through feed heaters 28, 29 and 30. The flow through pipe 62 is dependent on the amount of steam generated by the boiler unit and consequently with the amount of steam flow through the turbine. It will thus be seen that the result of variation of flow of steam through the turbine is to vary the feed water flow accordingly. The feed water flow being varied in accordance with variations of quantity of steam flowing through the turbine, the pump units operate, for the different loads, to provide the correct discharge pressures.

It will be seen that, in the plant shown and described, the pump assemblies 50 and 60 are automatically regulated whereas this boiler feed pump 63 is not regulated. The boiler feed pump may be of any commercial type of centrifugal boiler feed pump. In the usual type of installation it is necessary to design the boiler feed pump with a relatively flat head curve, due to the fact that it is required to pump against a substantially constant total head. In my system, the pump operates against the least total head when the load on the turbine is the greatest, and against the greatest total head when the load on the turbine is the least. This is due to the fact that the pressure at the suction of the boiler feed pump, the pressure in the heater from which this feed pump draws its supply, and the total amount of water flowing, all vary together and in the same sense, as and in proportion to the load on the turbine, and the total head against which the pump operates is a minimum when its suction pressure is at a maximum, and vice versa.

As has been pointed out above, the bleed conduits normally maintain open unrestricted communication between the turbine and the heaters. It has also been pointed out that the presence at the bleed points has a give relation to the turbine load. Furthermore, it has been pointed out that it is a characteristic of a centrifugal pump that at a given speed the amount of water pumped will vary inversely to the total pumping head. Considering now Fig. 1, assume that there is an increased load and that consequently the regulator 13 admits more steam to the turbine section 12. This will result in an increased pressure at the bleed point 16. This increased pressure is transmitted through the open conduit 33 to the heater 32 and raises the pressure on the suction side of pump 63. The pumping head of pump 63 is, of course, the differential between the discharge pressure and the suction pressure. Consequently, if the suction pressure is increased, the pumping head is decreased. It follows, in accordance with the characteristic of centrifugal pumps above pointed out, that the decrease in head differential, that is, the total pumping head, will result in pumping more water, although the pump does not change its speed. Therefore, on account of increase in load and increase in steam flow through the turbine, the pump 63 will pump more water without any regulation. At the same time the decrease in water level takes place in vessel 61 as the result of which the regulation takes care of an increase of flow of feed water through the pump assemblies 60 and 50. It has been found in practice with this system that it is not necessary to regulate the flow of feed water to the boiler except at infrequent intervals, for example, once in eight to ten hours.

In using a motor speed controller of any commercial type, motor speed is varied in steps. For instance, there may be a speed variation of 3% between the controller steps. The water legs take care of this difference and permit this type of regulation, thus affording local adjustment and maintaining the flow properly coordinated.

Figure 7:
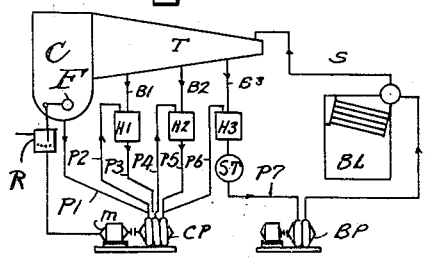
Fig. 7 is a diagrammatic showing of another steam plant embodying the invention.

It will be seen that it is not important where the float regulator is placed so long as the arrangement is such that there is a relation between feed water flow and quantity of steam passing through the turbine. In certain cases, the float may be placed in the condenser hot well as shown in Fig. 7, the float being designated at F and controlling a regulator R operative to increase the speed of motor M driving the centrifugal pump CP on rise of the float F and, inversely, decrease the speed of the motor on lowering of the float F. Fig. 7 is taken from my copending application Serial No. 335,960, and the subject matter of that application is hereby continued herein. The operation of the arrangement shown in Fig. 7 is essentially the same as that above described. The boiler BL supplies steam through the conduit S to the turbine T to which is connected a condenser C. Bleed lines B1, B2 and B3 connect with heaters H1, H2 and H3. The pipes P2, P3, P4, P5 and P6 connect the heaters with the pump sections of the centrifugal pump CP. Water flows from heater H3 to a tank ST and thence through conduit P7 to the boiler feed pump BP, which is not regulated, and thence to the boiler BL.

It will be seen that all the pump units may be arranged on a single shaft and driven by a single motor. In certain plants, due to length of piping and other considerations, it may be advisable to divide the pump units as shown in Fig. 1 or in other ways. This does not detract from the advantages of the invention. The arrangement shown in Fig. 1, as above stated, is the arrangement of an actual plant wherefore the distribution of pump units on shafts has been shown as in the actual plant.

In using water legs to compensate for variations of flow locally in the units, it may be found in certain cases that the necessary water columns become too high. If this is the case, an equivalent effect can be obtained by using the arrangement shown in Fig. 1 in connection with pipes 54 and 58. The float 73 operates a valve 74 in pipe 58. If the level in float chamber 55 lowers, valve 74 is closed somewhat. With centrifugal pumps, for a given speed, the quantity of water discharged may be regulated by adjusting the size of the discharge orifice. If the water level rises in vessel 55, valve 74 will be opened more or less, thus increasing the flow to heater 32. It will be noted that in order to utilize the water leg principle of adjustment it is necessary to have pumping units which can pump at more than one rate of flow for a given speed, and this precludes the use of any type of positive displacement pumps such as reciprocating or rotary.

Figure 5:
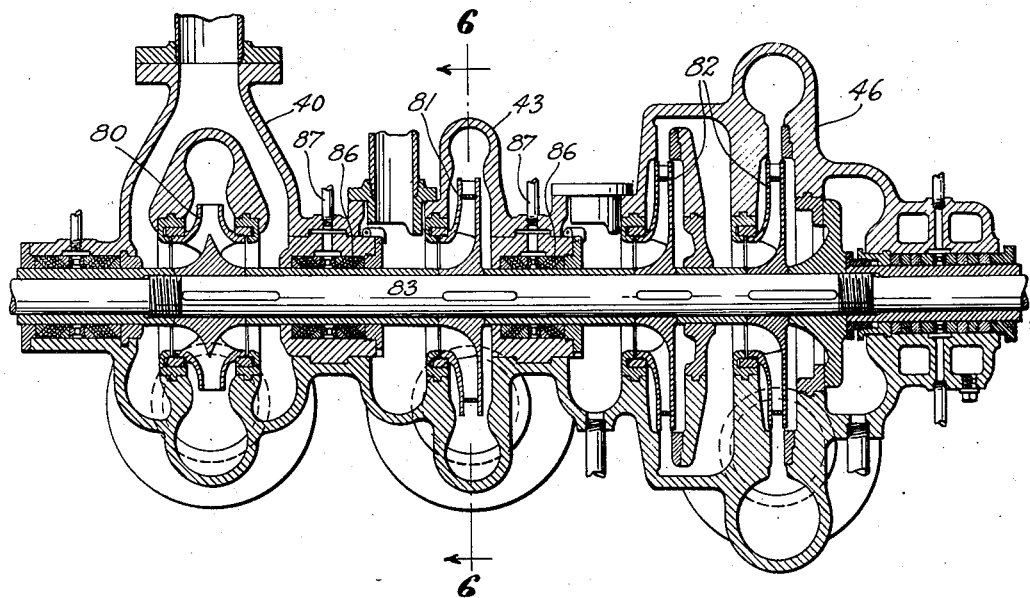
Fig. 5 is one view of pump mechanism.
Figure 6:
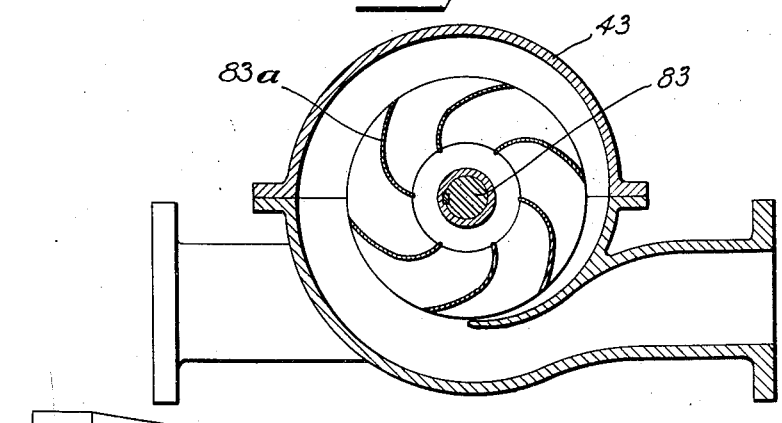
Fig. 6 is a cross-sectional view taken on line 6—6 of Fig. 5.

Figs. 5 and 6 show a form of the pump units comprising sections 40, 43 and 46 of Fig. 1. The impellers 80, 81 and 82 of the three sections, respectively, are mounted on a common shaft 83 and rotate therewith. Each impeller comprises radially extending walls between which are vanes which are suitably designed to give the pumping effect necessary in accordance with the characteristics as above outlined. Fig. 6 shows the curvature of the vanes 83a for the intermediate section 43. Each pump section has individual inlet and outlet connections. The inlet and outlet connections 84 and 85 respectively, for section 43, are shown in Fig. 6. Packing 86 is provided between each of the sections. There is no communication along the axis of the shaft between the sections. The packings may be supplied with water for packing purposes through pipes 87. It will be obvious from the above description that the successive sections in the line of flow are designed to handle increasing quantities of water and to develop increasingly higher pressures.

In order to prevent accidental back flow through the bleed conduits, I provide check valves 90. These check valves permit steam to flow from the turbine stages to the open heaters, but prevent back flow through these bleed connections of any water which might accidentally back up in the heaters.

As a matter of precaution, I provide valves in each of the bleed connections which close in case the emergency turbine control valve is tripped. I have diagrammatically indicated this as follows: The emergency turbine control valve is indicated at 91. This valve is normally open. Connected with this valve is a regulator 92, which tends to hold the valve open. The trip is indicated at 93. Should the speed of the turbine rise excessively the trip 93 will cause valve 94 to open. This valve 94 is connected between pipes 95 and 99. Pipe 95 is supplied with oil under pressure from a suitable source. If valve 94 is open, oil is admitted to pipe 99 and regulator 92, which closes valve 91. At the same time the oil pressure is transmitted through pipe 99 to a series of valves which, on rise of such oil pressure, close the various bleed connections. I have shown one of these at 96. A spring 97 acting against a piston or the like 98 tends to keep valve 96 open. When the oil pressure in pipe 99 overcomes the force of spring 97, valve 96 is closed. There is a valve 96 in each of the bleed connections 33, 34, 35, 36 and 37. It will be understood that this showing is diagrammatic and that in practice valves 90 and 96 may be combined into a single valve unit. This arrangement provides automatic protection against the possibility of the feed water backing up into the turbine, in case the turbine is shut down by the automatic trip. This arrangement is independent of both feed water and steam conditions. It will be readily seen that instead of having springs 97 act to keep valves 96 open and having the oil applied in case of emergency to counteract the springs, it is possible, and even preferable, to have the parts reversed, springs 97 tending to hold valves 96 closed, and the oil pressure being normally applied to keep valves 96 open and, in case of emergency, released to permit the springs to close the valves. It will be understood that the showing is diagrammatic and that any structure operating to accomplish the closing of valves 96 in case of emergency is intended to be illustrated by the diagrammatic showing.

In the above description and in the accompanying drawings, I have, for sake of clearness, illustrated and described only so much of a plant as is necessary to an understanding of the invention. It will be understood to those skilled in the art that any plant embodying the invention would include the usual plant equipment in addition to what I have illustrated and described. For example, there would be various valves in the conduits which are not shown or described. Non-condensible gases which would tend to collect in the heaters would be conducted away and the heat thereof recovered by suitable means.

While I have shown and described one embodiment of my invention in accordance with the patent statutes, it will be understood that my invention is capable of embodiment in a variety of forms of apparatus and that I am not limited to the specific arrangement or structural parts shown and described, but that the scope of invention is to be gauged by the accompanying claims taken in connection with the state of the prior art.

What I claim is:

1. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to the maximum load, at all times during normal operation, and additional conduits connecting the aforesaid plant parts for conducting steam from the steam generating means to the turbine and condenser and for conducting water from the condenser through the feed water heaters in the order of increasing pressure and thence to the steam generating means, said pump elements being interposed between the condenser and the lowest pressure heater, and between the heaters, and between the highest pressure heater and the steam generating means, said pump elements being situated below said heaters, the vertical disposition of a pump element between two of said heaters and said two heaters being sufficient to provide separate liquid columns acting on the suction and discharge sides of said pump element operative to adjust the quantity of water pumped by said pump element to the quantity being pumped as a whole through the heaters.

2. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to the maximum load, at all times during normal operation, and additional conduits connecting the aforesaid plant parts for conducting steam from the steam generating means to the turbine and condenser and for conducting water from the condenser through the feed water heaters in the order of increasing pressure and thence to the steam generating means, said pump elements being interposed between the condenser and the lowest pressure heater, and between the heaters, and between the highest pressure heater and the steam generating means, said pump elements being situated below said heaters, the vertical disposition of a plurality of said pump elements and the heaters being sufficient to provide separate liquid columns acting on the suction and discharge sides of said plurality of pump elements operative to adjust the quantity of water pumped by the individual pump elements of said plurality of pump elements to the quantity being pumped as a whole through the heaters.

3. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to the maximum load, at all times during normal operation, additional conduits connecting the aforesaid plant parts for conducting steam from the steam generating means to the turbine and condenser and for conducting water from the condenser through the feed water heaters in the order of increasing pressure and thence to the steam generating means, said pump elements being interposed between the condenser and the lowest pressure heater, and between the heaters, and between the highest pressure heater and the steam generating means, said pump elements being situated below said heaters, a float in the conduit connecting a feed heater of said plurality of feed water heaters with the pump element receiving water therefrom, and a valve in the conduit connecting said last-mentioned pump element and the heater of next higher pressure, said float being connected to said valve to increase the valve opening on rise of the float to adjust the quantity of water pumped by said pump element to the quantity being pumped as a whole through the heaters.

4. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to the maximum load, at all times during normal operation, additional conduits connecting the aforesaid plant parts for conducting steam from the steam generating means to the turbine and condenser and for conducting water from the condenser through the feed water heaters in the order of increasing pressure and thence to the steam generating means, said pump elements being interposed between the condenser and the lowest pressure heater, and between the heaters, and between the highest pressure heater and the steam generating means, and a float in the conduit connecting one of said feed heaters with the pump element receiving water therefrom, a valve in the connection between said pump element and the heater of next higher pressure, said float being connected to said valve to increase the valve opening on rise of the float to adjust the quantity of water pumped by said pump element to the quantity being pumped as a whole through the heaters, other of said pump elements being situated below said heaters, the vertical disposition of said other pump elements and said heaters being sufficient to provide separate liquid columns acting on the suction and discharge sides of said other pump elements operative to adjust the quantity of water pumped by said other pump elements to the quantity being pumped as a whole through the heaters.

5. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure and thence to the steam generating means, said pump elements being interposed between the condenser and the lowest pressure heater, and between the heaters, and between the highest pressure heater and the steam generating means, and means to control the speed of the pump elements pumping water into the feed water heaters in accordance with variations in the quantity of water being pumped, the pressure in the heater of highest pressure acting on the suction side of the pump element receiving water therefrom to vary its pumping head and thereby the quantity of water pumped to the steam generating means.

6. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effectve flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure and thence to the steam generating means, said pump elements being interposed between the condenser and the lowest pressure heater, and between the heaters, and between the highest pressure heater and the steam generating means, the pressure in the heater of highest pressure acting on the suction side of the pump element receiving water therefrom to vary its pumping head and thereby the quantity of water pumped into the steam generating means, and means responsive to variations in water level caused by variations in quantity of water pumped by the last-mentioned pump element to control the speed of the other pump elements.

7. A steam power plant comprising steam generating means, a turbine, a condenser, a plurality of direct steam and water contact feed water heaters, means for pumping water comprising a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure, and additional means for pumping water from the heater of highest pressure to the steam generating means, said pump elements being interposed between the condenser and the lowest pressure heater and between the heaters, and said pump elements each having a rising head curve from zero to maximum discharge quantities for coordinating the feed water flow to the pressures at the bleed points.

8. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure, means for pumping water from the heater of highest pressure to the steam generating means, said pump elements being interposed between the condenser and the lowest pressure heater and between the heaters, means responsive to variations of quantity of water flowing through said feed water heaters for regulating the speed of said pump elements, and said pump elements each having a rising head curve from zero to maximum discharge quantities for coordinating the feed water flow to the pressures at the bleed points.

9. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure, means for pumping water from the heater of highest pressure to the steam generating means, said pump elements being interposed between the condenser and the lowest pressure heater and between the heaters, the pressure in the heater of highest pressure acting on the suction side of the pumping means receiving water therefrom to vary its pumping head and thereby the quantity of water pumped into the steam generating means, means responsive to variations in water level caused by variations in quantity of water pumped by the last-mentioned pumping means to control the speed of said pump elements, and said pump elements each having a rising head curve from zero to maximum discharge quantities for coordinating the feed water flow to the pressures at the bleed points.

10. A steam power plant comprising steam generating means, a turbine, a condenser, a plurality of direct steam and water contact feed water heaters, means for pumping water comprising a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure, means for pumping water from the heater of highest pressure to the steam generating means, said pump elements being interposed between the condenser and the lowest pressure heater and between the heaters, and said pump elements each having a rising head curve from zero to maximum discharge quantities for coordinating the feed water flow to the pressures at the bleed points, said pump elements being situated below said heaters, the vertical disposition of a pump element between two of said heaters being sufficient to provide separate liquid columns acting on the suction and discharge sides of said last-mentioned pump element to adjust the quantity of water pumped by said last-mentioned pump element to the quantity being pumped as a whole through the heaters.

11. A steam power plant comprising steam generating means, a turbine, a condenser, a plurality of direct steam and water contact feed water heaters, means for pumping water comprising a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure, means for pumping water from the heater of highest pressure to the steam generating means, said pump elements being interposed between the condenser and the lowest pressure heater and between the heaters, and said pump elements each having a rising head curve from zero to maximum discharge quantities for coordinating the feed water flow to the pressures at the bleed points, a float in the conduit connecting a feed heater of said plurality of heaters with the pump element receiving water therefrom, and a valve in the conduit connecting said last-mentioned pump element and the heater of next higher pressure, said float being connected to said valve to increase the valve opening on rise of the float to adjust the quantity of water pumped by said pump element to the quantity being pumped as a whole through the heaters.

12. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure, means for pumping water from the heater of highest pressure to the steam generating means, said pump elements being interposed between the condenser and the lowest pressure heater and between the heaters, means responsive to variations of load on the turbine for regulating the speed of said pump elements, and said elements each having a rising head curve from zero to maximum discharge quantities for coordinating the feed water flow to the pressures at the bleed points.

13. A steam power plant comprising steam generating means, a turbine, a condenser, a plurality of direct steam and water contact feed water heaters, a plurality of centrifugal pump elements, bleed conduits connecting each of said feed water heaters with points of different pressure in the turbine, said bleed conduits being of normally constant effective flow area permitting a maximum flow of steam therethrough, corresponding to maximum load, at all times during normal operation, additional conduits connecting the aforesaid plant parts for conducting steam from the steam generating means to the turbine and condenser and for conducting water from the condenser through the feed water heaters in the order of increasing pressure, means for pumping water from the heater of highest pressure to the steam generating means, said pump elements being interposed between the condenser and the lowest pressure heater and between the heaters, said pump elements being situated below said heaters, the vertical disposition of a pump element between two of said heaters and said two heaters being sufficient to provide separate liquid columns acting on the suction and discharge sides of said pump element, and means responsive to variations of load on the turbine for regulating the speed of said pump elements.

In testimony whereof I have hereunto affixed my signature.

RALPH C. ROE.